United States Patent [19]

Bleger et al.

[11] Patent Number: 5,452,987
[45] Date of Patent: Sep. 26, 1995

[54] FAN HOUSING

[75] Inventors: Claude Bleger, Duttlenheim, France; Jochen Goehre, Karlsruhe, Germany; Claudius Muschelknautz, Lauf, Germany; Horst Ruf, Gaggenau, Germany

[73] Assignee: Robert Bosch GmbH, Stuttgart, Germany

[21] Appl. No.: 145,889

[22] Filed: Oct. 29, 1993

[30] Foreign Application Priority Data

Sep. 12, 1992 [DE] Germany .................... 42 41 406.7

[51] Int. Cl.⁶ .................................................. F04D 29/60
[52] U.S. Cl. .................................................. 415/214.1
[58] Field of Search ............................. 415/198.1, 199.1, 415/200, 214.1

[56] References Cited

U.S. PATENT DOCUMENTS

| | | | |
|---|---|---|---|
| 2,673,752 | 3/1954 | Swearingen | 415/214.1 |
| 4,390,317 | 6/1983 | Lehmann et al. | 415/198.1 |
| 4,406,582 | 9/1983 | LaGrange | 415/214.1 |
| 4,770,606 | 9/1988 | Kuroiwa | 415/199.1 |
| 4,997,342 | 3/1991 | Conger, IV | 415/214.1 |
| 5,207,560 | 5/1993 | Urban | 415/199.1 |

Primary Examiner—John T. Kwon
Attorney, Agent, or Firm—Michael J. Striker

[57] ABSTRACT

The fan housing for a multistage fan has a first housing part for receiving the electric motor, a second housing part mounted coaxially on the first housing part, and a housing cover mounted on the opposing side of the second housing part. So that fan noise is minimize during fan operation, for improved protection from external effects and to avoid tension originating from thermal expansion in the blower housing the housing cover for the second housing part has a peripheral cover edge portion and is pot-shaped or cap-shaped; the housing cover completely overlaps the second housing part; an overlapping peripheral portion of this housing cover has a radial spacing from the second housing part so as to form an air cushion between the second housing part and the housing cover and the cover edge portion of the housing cover is supported on the first housing part so as to enclose the second housing part.

7 Claims, 2 Drawing Sheets

5,452,987

FAN HOUSING

BACKGROUND OF THE INVENTION

The present invention relates to a fan housing, particularly for a secondary fan of an internal combustion engine with a regulated three way catalytic converter.

This type of secondary air fan, which is predominantly multistage, is used in an internal combustion engine with a regulated three-way catalytic converter, to force air into the exhaust system and thus to initiate an afterburning of the exhaust gas.

In a known fan or blower housing of this type the disk-like housing cover is attached by self-tapping steel screws in a first housing part. These steel screws which are distributed uniformly circumferentially around the periphery of the first housing part extend over the entire axial length of the second housing part. Since particularly in a multistage blower the second housing part has a truly large axial length, the steel screws must be comparatively long threaded bolts. The second housing part is formed in two sections according to the structure of the multistage fan. Both housing part sections are connected aligned with each other. The connection of the second housing part sections to each other, the connection of the second housing part and the first housing part and of the second housing part to the cover occurs by a groove-projecting member joint in which projecting members and circular grooves engage each other in a positive locking manner.

This type of fan housing results in the generation of a comparatively large amount of noise during fan operation. Since the individual housing parts are made of plastic and the plastic has about a six times higher thermal expansion coefficient than the steel screws, a comparatively large tension results from the thermal expansion, which must be taken by the housing parts, so that they can be made only of a comparatively soft or yielding material.

SUMMARY OF THE INVENTION

It is an object of the present invention to provide a fan housing, which does not have the above-described disadvantages.

Particularly, it is also an object of the present invention to provide a fan housing of the above described type for a multistage fan, which provides considerably less noise than the fan housing of the prior art during operation of a multistage fan.

These object and others which will be made more apparent hereinafter are attained in a fan housing for a multistage fan having a first housing part for receiving an electric motor, a second housing part mounted coaxially on the first housing part, and a housing cover mounted on an opposing side of the second housing part.

According to the invention the housing cover mounted on the second housing part has a peripheral cover edge portion and is pot-shaped or cap-shaped. This housing cover completely overlaps or covers the second housing part and has an overlapping circumferential portion spaced with radial clearance from the second part. The cover edge portion of the housing cover is supported on the first housing part.

The foregoing structure provides a reduction in noise produced by the operating fan.

In a preferred embodiment of the invention the first housing part has a peripheral circular projecting member protruding in an axial direction on an opposing end thereof facing the housing cover; the projecting member is overlapped by an outer circumferential edge portion of the housing cover and the projecting member and the housing cover are provided with bearing surfaces facing each other and formed as conical sealing surfaces. Because of this structure, a peripheral sealing surface, which is independent of tolerances between the housing parts, particularly in multistage fans, is formed. Because of that, no leakage to the outside occurs and the entire efficiency of the fan is improved and also the internal mechanism of the fan is protected to a certain extent from the surroundings.

In a particularly preferred embodiment the cover edge portion of the housing cover has protruding eyes distributed uniformly circumferentially in the vicinity of the flange-like edge portion of the first housing part and formed in one piece with the housing cover and the flange-like edge portion of the first housing part has corresponding protruding eyes distributed uniformly circumferentially in the vicinity of the cover edge portion of the housing cover, also formed in one piece with the first housing part, so that each of the protruding eyes of the first housing part is aligned with a respective protruding eyes of the housing cover and spaced closely therefrom. The connecting means, which can include self-tapping screws, pass through throughgoing holes in the eyes of the first housing part and engage in blind holes in the eyes of the housing cover so as to secure the housing cover to the first housing part. Because of this structure, the clamping length of the steel self-tapping screws is kept to a minimum. When the housing parts and housing cover are made of plastic, now the effect of the different thermal expansion coefficients of the steel screws and the plastic housing parts is minimized. The housing parts do not need to compensate for large thermal stresses and can be made of relatively stiff material.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
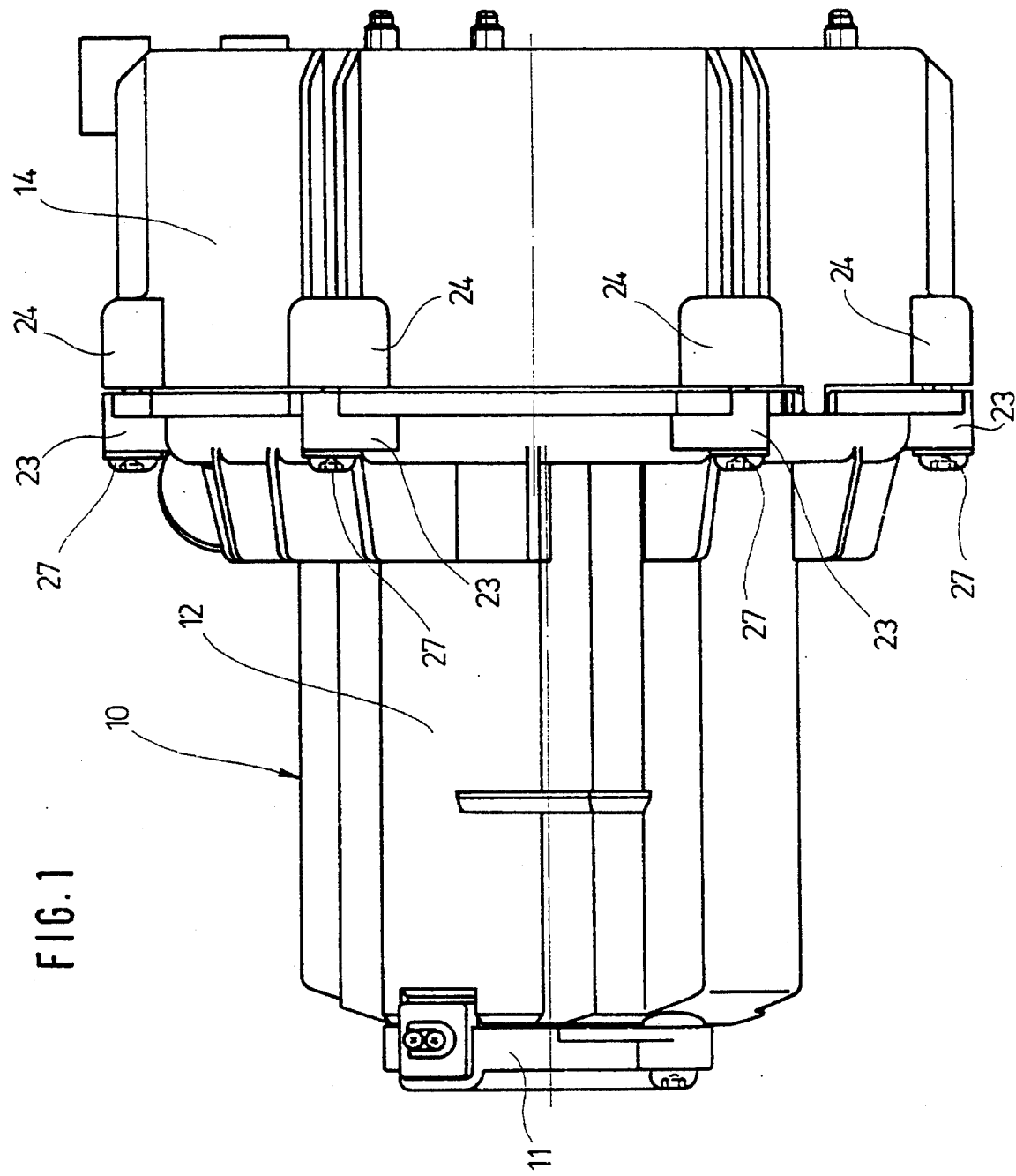
FIG. 1 is a side elevational view of a secondary fan for an internal combustion engine having a fan housing according to the invention.
Figure 2:
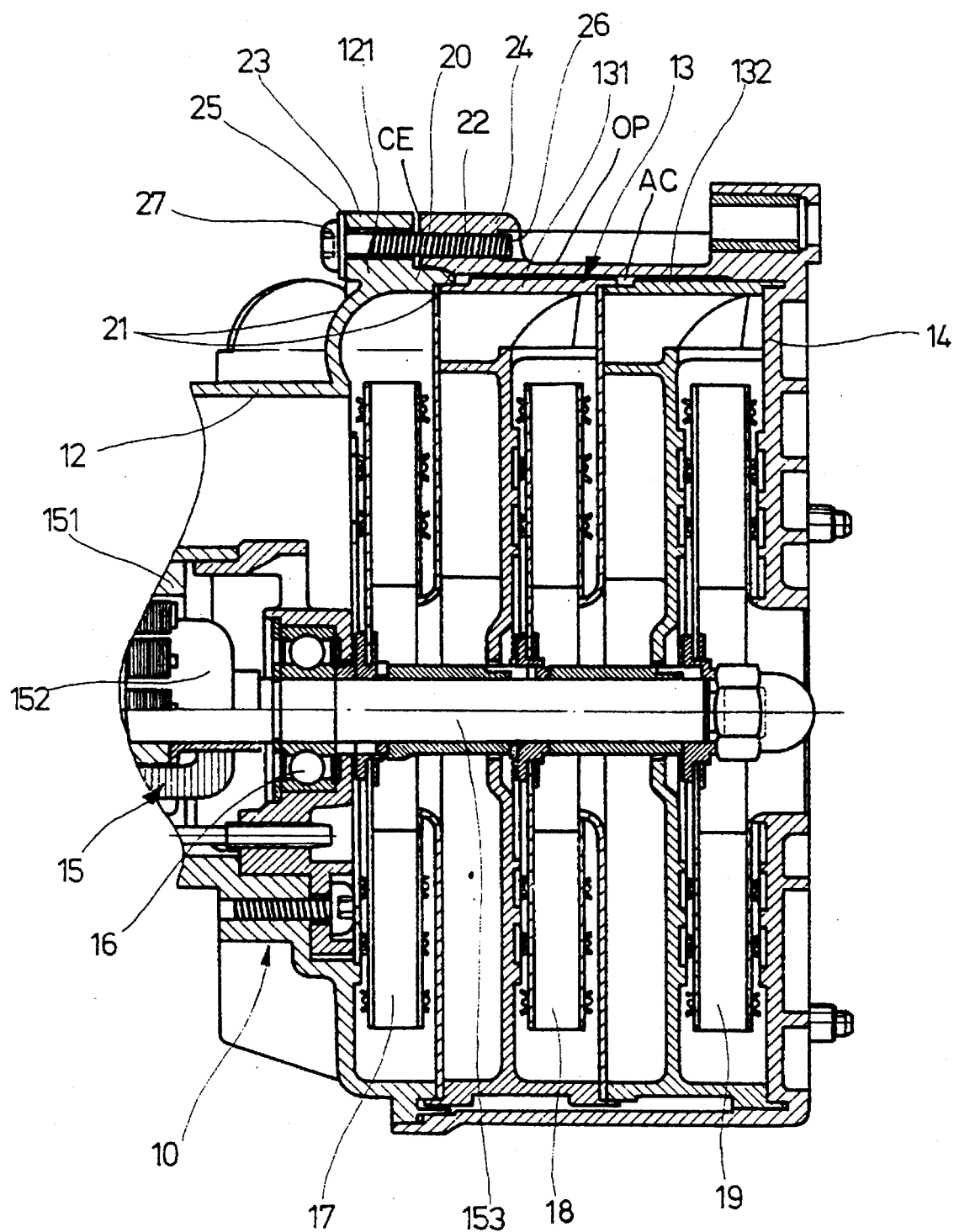
FIG. 2 is a cutaway longitudinal cross-sectional view of the apparatus shown in FIG. 1.

A three-stage secondary fan for an internal combustion engine is shown in the drawing and includes a housing 10 according to the invention. The housing 10 is made of plastic material and comprises a cylindrical first housing part 12 covered on a front side with a front cover 11, a second housing part 13 mounted coaxially on the first housing part 12 and a housing cover 14 on the front side of the second housing part 13. The first housing part 12 holds an electric motor 15, whose stator 151, armature 152 and armature shaft 153 are shown in FIG. 2. The armature shaft 153 with the armature 152 mounted on it is mounted rotatable in the first housing part in two radial bearings, of which the right radial bearing 16 is seen in FIG. 2. The armature shaft 153 projects into the second housing part 13 and carries there three fan or blower blades 17, 18 and 19, which are nonrotatably attached to the armature shaft 153. The second housing part 13 comprises two separate circular-cross-sectioned housing sections 131 and 132 attached coaxially to each other, which received the fan blades 18 and/or 19 and contain radially extending air guide ribs. The fan blade 17 is mounted in a flange-like edge portion 121 of the first housing 12, which is in one-piece with the remainder of the first housing part 12. The flange-like edge portion 121 has a larger diameter than the remainder of the first housing part 12.

The housing cover 14 mounted on the front side of the second housing part is pot-shaped or cap-shaped. It overlaps or covers the second housing part 13 completely and an overlapping circumferential portion OP of the housing cover 14 is spaced with a radial clearance from the second housing part 13 and extends up to the place where it bears on the first housing part 12. The peripheral cap edges of the housing cover 14 are supported on or bear on the first housing part 12. Because of that in the vicinity of the fan blades 17 to 19 the fan housing is double-walled and there is an air cushion AC enclosed between the twin walls, so that a substantial noise reduction is attained in the operating noise originating from this region of the fan.

The first housing part 12 has a peripheral circular projecting member 20 protruding in an axial direction on an opposing end facing the housing cover 14, which is overlapped by a circumferential cover edge portion CE of the housing cover 14. The bearing surfaces 21 and 22 resting on each other and facing each other on the projecting member 20 and the inner wall of the cover edge portion CE of the housing cover 14 are formed as conical sealing surfaces, which are forced by each other in the axial direction and form circumferential sealing surfaces between the housing cover 14 and a first housing part 12. Because of these conical sealing surfaces it is possible to compensate for tolerances occurring between the housing parts 12,13.

The housing cover 14 is attached to a first housing part 12, whereby the second housing part 13 is secured to the first housing part 12. Radially protruding eyes 23 and/or 24 distributed uniformly around the periphery of the first housing 12 are formed in one-piece on the first housing 12 in the vicinity of the cap edges CE and/or on the housing cover 14 immediately adjacent the first housing 12. The protruding eyes 23 on the first housing part 12 and the eyes 24 on the housing cover 14 align with each other with a small axial spacing from each other and receive connecting means, with which the housing cover 14 is secured to the first housing cover 12. In the present preferred embodiment the connecting means are self-tapping steel screws 27, which extend through a hole 25 in the eye 23 in the first housing part 12 and engage in the walls of a blind hole 26 provided in the eye 24 in the housing cover 14. Because of the comparatively smaller axial length of the eyes 23 and 24 and their reduced spacing from each other, the clamping length or securing length of the steel screws is minimized so that the effect of the difference in thermal expansion coefficients between the plastic housing 10 and the steel screws 27 can be kept sufficiently small. The housing parts 12, 13 must compensate for no large thermal expansion and can be made of a comparatively stiff material.

It will be understood that each of the elements described above, or two or more together, may also find a useful application in other types of structures differing from the types described above.

While the invention has been illustrated and described as embodied in a fan housing, particularly a fan housing of a secondary fan of an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

What is claimed is:

1. Fan housing for a multistage fan having an electric motor and a plurality of fan blades connected to and driven by said electric motor, said fan housing comprising a first housing part for receiving said electric motor, a second housing part mounted coaxially on said first housing part, and a housing cover mounted on an opposing side of said second housing part facing said housing cover, wherein said housing cover is pot-shaped or cap-shaped and has an axially-extending overlapping circumferential portion with a circumferential cover edge portion and said overlapping circumferential portion completely overlaps said second housing part and has a radial spacing from said second housing part so as to form an air cushion between said second housing part and said overlapping circumferential portion, and said circumferential cover edge portion of said housing cover is supported on said first housing part.

2. Fan housing as defined in claim 1, wherein said first housing part has a peripheral circular projecting member protruding in an axial direction on an opposing end thereof facing said housing cover, said projecting member is overlapped by said circumferential cover edge portion of said housing cover and said projecting member and said cover edge portion are each provided with bearing surfaces facing each other, said bearing surfaces being formed as conical sealing surfaces.

3. Fan housing as defined in claim 1, further comprising connecting means for securing said housing cover to said first housing part, said connecting means being provided in said cover edge portion of said housing cover and in a flange-like edge portion of said first housing part adjacent said cover edge portion.

4. Fan housing as defined in claim 3, wherein said connecting means comprise a plurality of self-tapping steel screws.

5. Fan housing for a multistage fan having an electric motor and a plurality of fan blades connected to and driven by said electric motor, said fan housing comprising a first housing part for receiving said electric motor, a second housing part mounted coaxially on said first housing part, a housing cover mounted on an opposing side of said second housing part facing said housing cover, said housing cover having a circumferential cover edge portion, and connecting means for securing said housing cover to said first housing part, said connecting means being provided in said cover edge portion and in a flange-like edge portion of said first housing part adjacent said circumferential cover edge portion, wherein said housing cover is pot-shaped or cap-shaped; said housing cover completely overlaps said second housing part; an overlapping circumferential portion of said housing cover has a radial spacing from said second housing part so as to form an air cushion between said second housing part and said housing cover, and said circumferential cover edge portion of said housing cover is supported on said first housing part and wherein said circumferential cover edge portion of said housing cover has protruding eyes distributed uniformly circumferentially in the vicinity of said flange-like edge portion of said first housing part and formed in one piece with said housing cover; said flange-like edge portion of said first housing part has protruding eyes distributed uniformly circumferentially in the vicinity of said cover edge portion and formed in one piece with said first housing part; each of said protruding eyes of said first housing part is aligned with a respective one of said protruding eyes of said housing cover and spaced closely therefrom and said connecting means engages in said protruding eyes of said housing cover and said protruding eyes of said first housing part.

6. Fan housing as defined in claim 5, wherein said first housing part, said housing cover and said second housing part are made from plastic and said connecting means is made from metal.

7. Fan housing as defined in claim 6, wherein said connecting means comprises a plurality of self-tapping screws and each of said eyes of said first housing part are provided with a throughgoing hole and each of said eyes of said housing cover are provided with a blind hole positioned so as to be aligned with said throughgoing hole of said protruding eye of said first housing part aligned therewith so that one of said self-tapping screws can pass through each of said throughgoing holes and engage in a corresponding one of said blind holes.

* * * * *